Dec. 6, 1938.    A. F. MOYER    2,139,200
EXTENSIBLE GANG LAWN MOWER
Filed Jan. 20, 1936    9 Sheets-Sheet 1

Inventor
AMOS F. MOYER
By Paul, Paul + Moore
ATTORNEYS

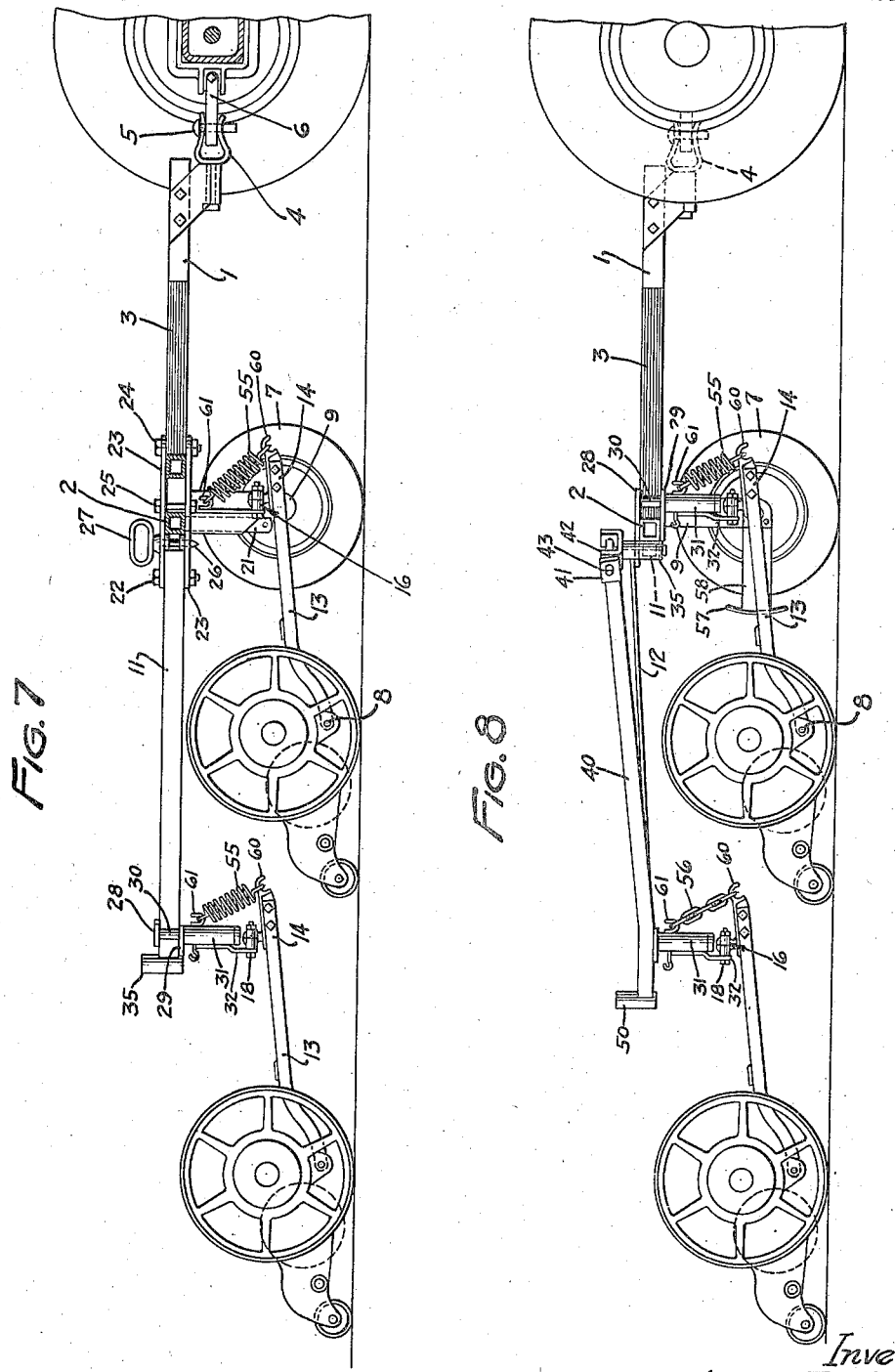

Dec. 6, 1938.   A. F. MOYER   2,139,200
EXTENSIBLE GANG LAWN MOWER
Filed Jan. 20, 1936   9 Sheets-Sheet 7
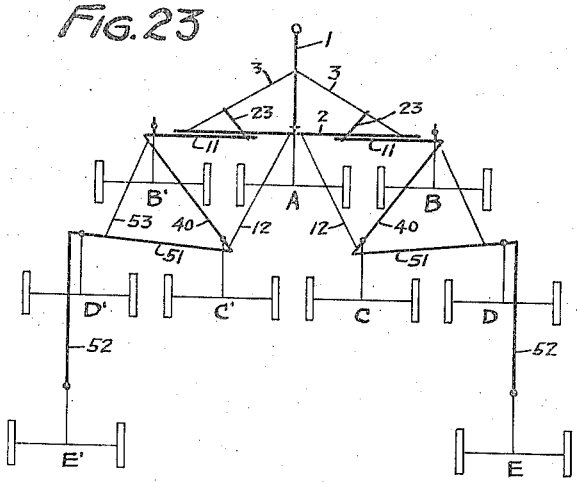
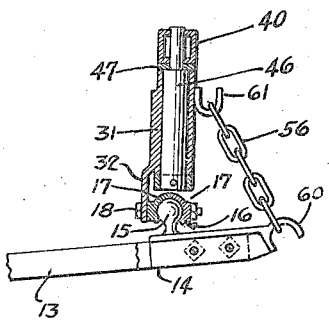
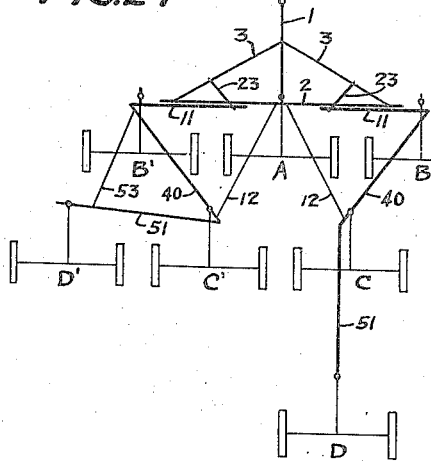
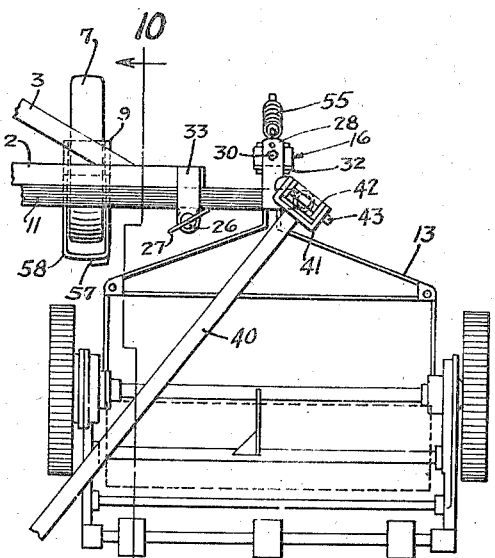
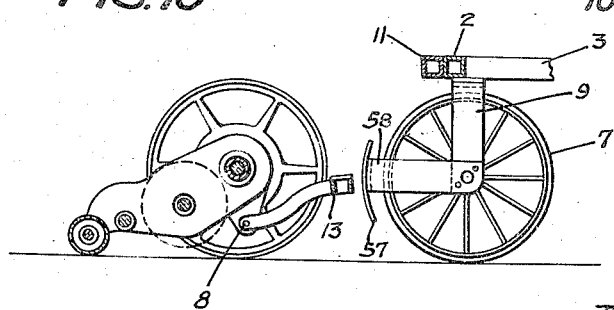
Inventor
AMOS F. MOYER
By Reed, Paul + Moore
ATTORNEYS

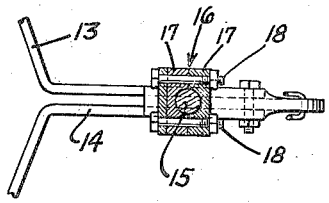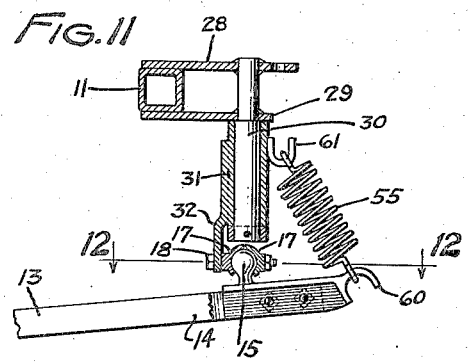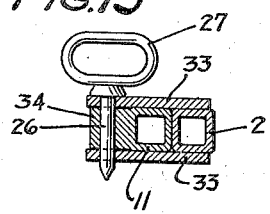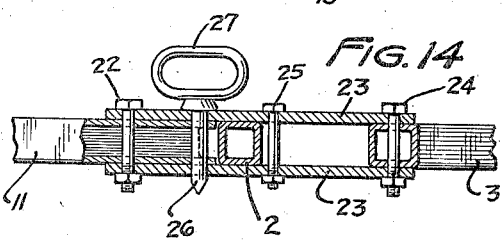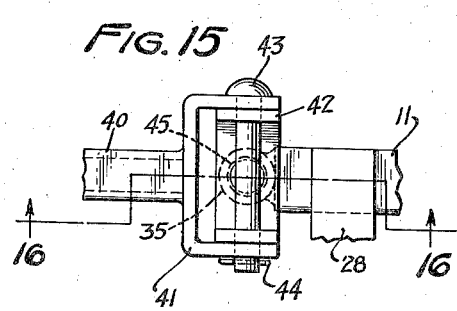

Dec. 6, 1938.  A. F. MOYER  2,139,200
EXTENSIBLE GANG LAWN MOWER
Filed Jan. 20, 1936  9 Sheets-Sheet 9

Inventor
AMOS F. MOYER

By Paul, Paul & Moore
ATTORNEYS

Patented Dec. 6, 1938

2,139,200

UNITED STATES PATENT OFFICE 2,139,200

EXTENSIBLE GANG LAWN MOWER

Amos F. Moyer, Minneapolis, Minn., assignor to Toro Manufacturing Corporation of Minnesota, a corporation of Minnesota Application January 20, 1936, Serial No. 59,932

17 Claims. (Cl. 56—7)

This invention relates to improvements in the gang lawn mower art, and consists primarily, when in operating condition, of a plurality of mower units flexibly connected to one another by suitable connecting bars and spacing rods, the group of mower units being also flexibly connected, without any supporting frame, to a hitch or draft rig, the mower units being arranged in overlapping positions so that the swath that is cut is substantially the combined width of the swaths cut by the several connected individual mower units.

The present invention is characterized by the fact that no supporting or connecting frame is employed. The device is operative when a single mower unit is employed, to which any desired number of additional units may be connected, limited only by the size and character of the land that is to be mowed, and the amount of power that is available for drawing the device.

While the hitch or draft rig that is illustrated in the accompanying drawings is adapted for connection to a tractor or power driven vehicle, suitable thill or pole couplings may be connected to the hitch or draft rig so that the device can be drawn by animal power.

The lawn mower units may be of any suitable standard construction, and the individual units are preferably all duplicates of one another, so that they may be used interchangeably and no particular order need be observed in connecting together any number of units to form an operative gang, of any desired number of units.

In the accompanying drawings, forming part of this specification

Figure 6 is a side elevation of the two outside units of a nine-unit gang, the view being taken in the direction of the arrows of line 6—6 of Figure 4.

Figure 7 is a side elevation and partial section on line 7—7 of Figure 1.

Figure 8 is a side elevation on line 8—8 of of Figure 3.

Figure 9 is a plan view of the right-hand forward unit of Figure 3, with means for preventing the swinging mower B from contacting the face of the wheels 7.

Figure 10 is a side elevation and partial section on line 10—10 of the structure shown in Figure 9.

Figure 11 is a detail vertical sectional view on line 11—11 of Figure 2 showing the pivotal connection of a mower unit with a connecting bar.

Figure 3:
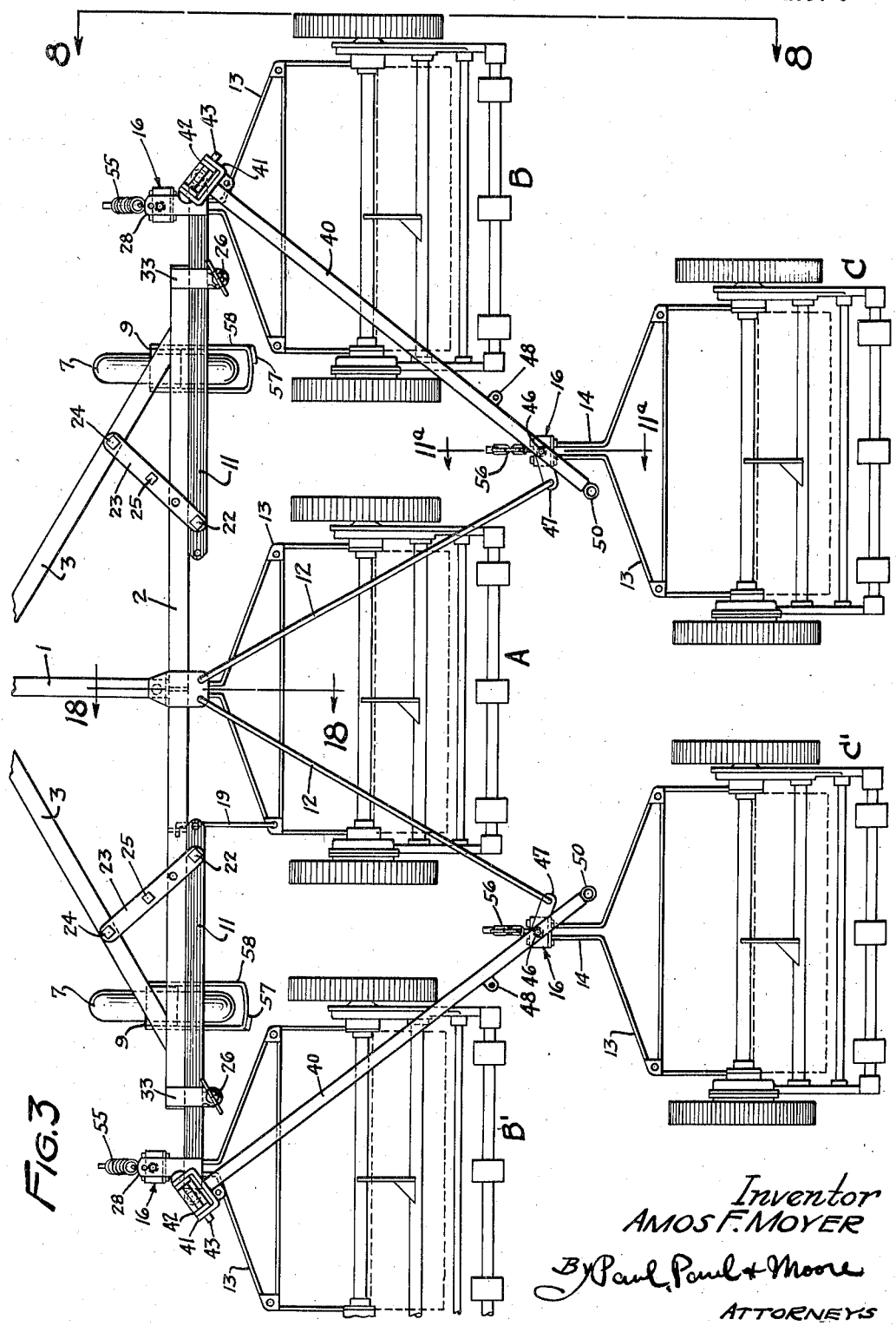
Figure 3 shows the arrangement illustrated in Figure 2 of the drawings with two additional mower units arranged in the rear of the three units shown in Figure 2, and properly spaced so as to cut the grass left uncut between the ends of the three forward units, thus forming a five-unit gang.

Figure 11$^a$ is a detail section through line 11$^a$—11$^a$ of Figure 3, looking in direction of arrows.

Figure 12 is a plan sectional view on line 12—12 of Figure 11, looking in the direction of the arrows.

Figure 2:
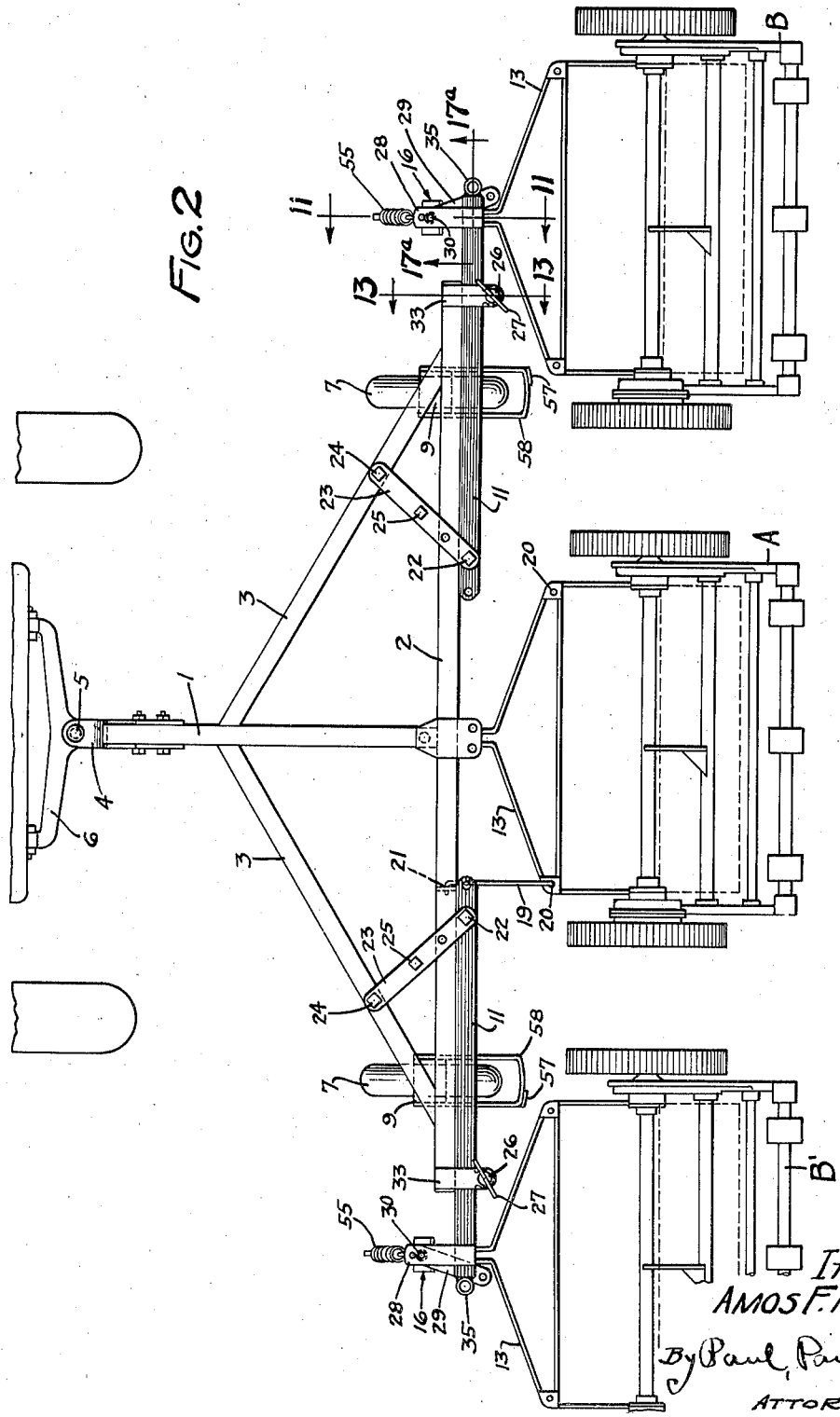
Figure 2 shows the same number of units arranged substantially in line to form the front row of a five-unit gang.

Figure 13 is a detail sectional view on line 13—13 of Figure 2, looking in the direction of the arrows.

Figure 1:
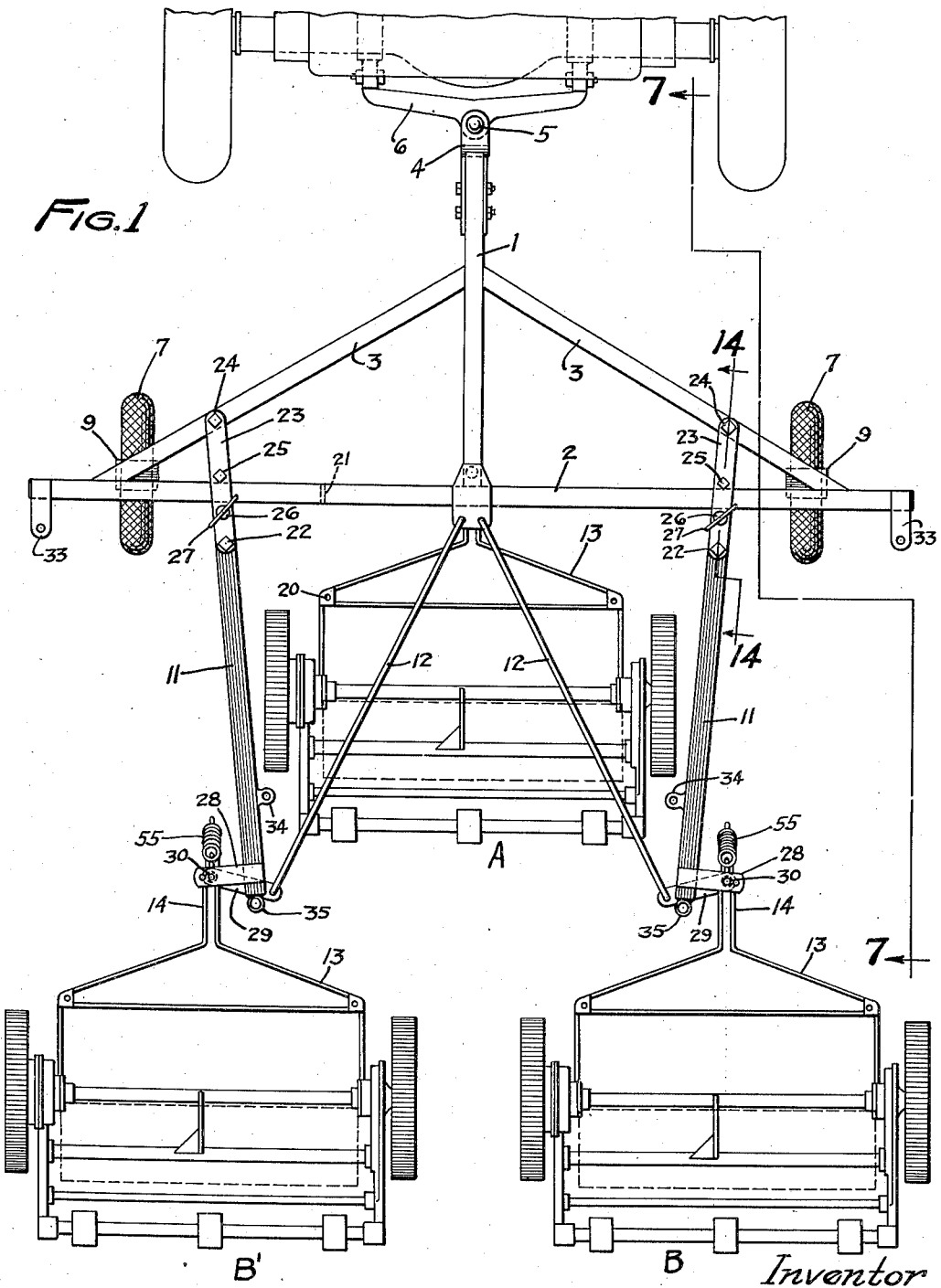
Figure 1 is a plan view showing the preferable means for connecting together three individual units to form a three-unit gang.

Figure 14 is a detail sectional view on line 14—14 of Figure 1, looking in the direction of the arrows.

Figure 15 is a plan view of the knuckle joint on the end of one of the connecting bars.

Figure 16 is a vertical section on line 16—16 of Figure 15.

Figure 17 is a side elevation of one member of the knuckle joint shown in Figures 15 and 16.

Figure 17$^a$ is a side elevation and partial section of the other member of the knuckle joint shown in Figures 15 and 16, the section being taken on line 17$^a$—17$^a$ of Figure 2.

Figure 18 is a vertical section and partial elevation, the section being taken on line 18—18 of Figure 3.

Figures 19–24 are diagrams illustrating the different arrangements of the individual units that may be made by the use of the hitch, the connecting bars and the spacing rods, and the numbers of units indicated in the said several figures of the drawings.

In the drawings, a suitable hitch or draft rig is provided, as shown in Figures 1, 2, 7 and 8 consisting of a main gang drawbar 1 to which is connected a cross-bar 2, and diagonally arranged brace bars 3—3. The drawbar 1 is provided at its forward end with a clevis 4, which may be connected by a pin 5 with a coupling bar 6 suitably attached to a tractor or other motor-driven vehicle. If it is desired to draw the gang by animal power, suitable thill or pole couplings for this purpose may be attached in any convenient manner to the hitch or draft rig.

Arranged, preferably beneath the outer ends of the cross-bar 2 and brace bars 3—3, are suitable wheels 7—7, which carry the weight of the cross-bar, and brace rods, by supports 9 secured to the brace rods 3—3 and cross-bar 2. The supports 9 for the wheels 7 are secured rigidly to the brace bars 3—3 so that the wheels 7 must follow the laterally swinging movements of the main drawbar 1, the cross-bar 2 and brace rods 3—3, forming the hitch or draft rig.

While the mower units are preferably all alike, and any unit may be used in any position in the gang, for convenience in description, the center unit, in the various combinations shown, is designated by the reference letter A, and the two additional units that make up the three-unit gang, are designated B and B'. When more than three units are employed, the units B and B' are first brought into the positions indicated in Figures 2, 3 and 4, where they are substantially in line with the unit A. To form a five-unit gang, units C and C' are added to the three units of the three-unit gang, as indicated in Figure 3 of the drawings, the units A, B and B' retaining the positions indicated in Figure 2. To form a seven-unit gang, units D and D' may be added to the five-unit arrangement shown in Figure 3. To provide a nine-unit gang, units E and E' will be added to the seven-unit arrangement, producing the nine-unit combination shown in Figure 4. Additional units may be added in a similar manner, to provide a gang consisting of eleven or more units.

While it is preferred to employ an odd number of units, such as three, five, seven or nine, with a center unit A, as shown in Figures 1, 3, 4 and 5, and as indicated in the several diagrams, if desired, a single unit mower may be arranged by omitting the side units B and B' of Figure 1, or a two-unit mower may be arranged by omitting either of the mower units B and B' of Figure 1. A four-unit mower may likewise be arranged by omitting either unit B or B' of Figure 3.

While the unit A will generally be arranged as a center unit, other operating units may, if preferred, be arranged on one side of the unit A, when the character of the ground being mowed makes a one-sided gang desirable.

Figure 4:
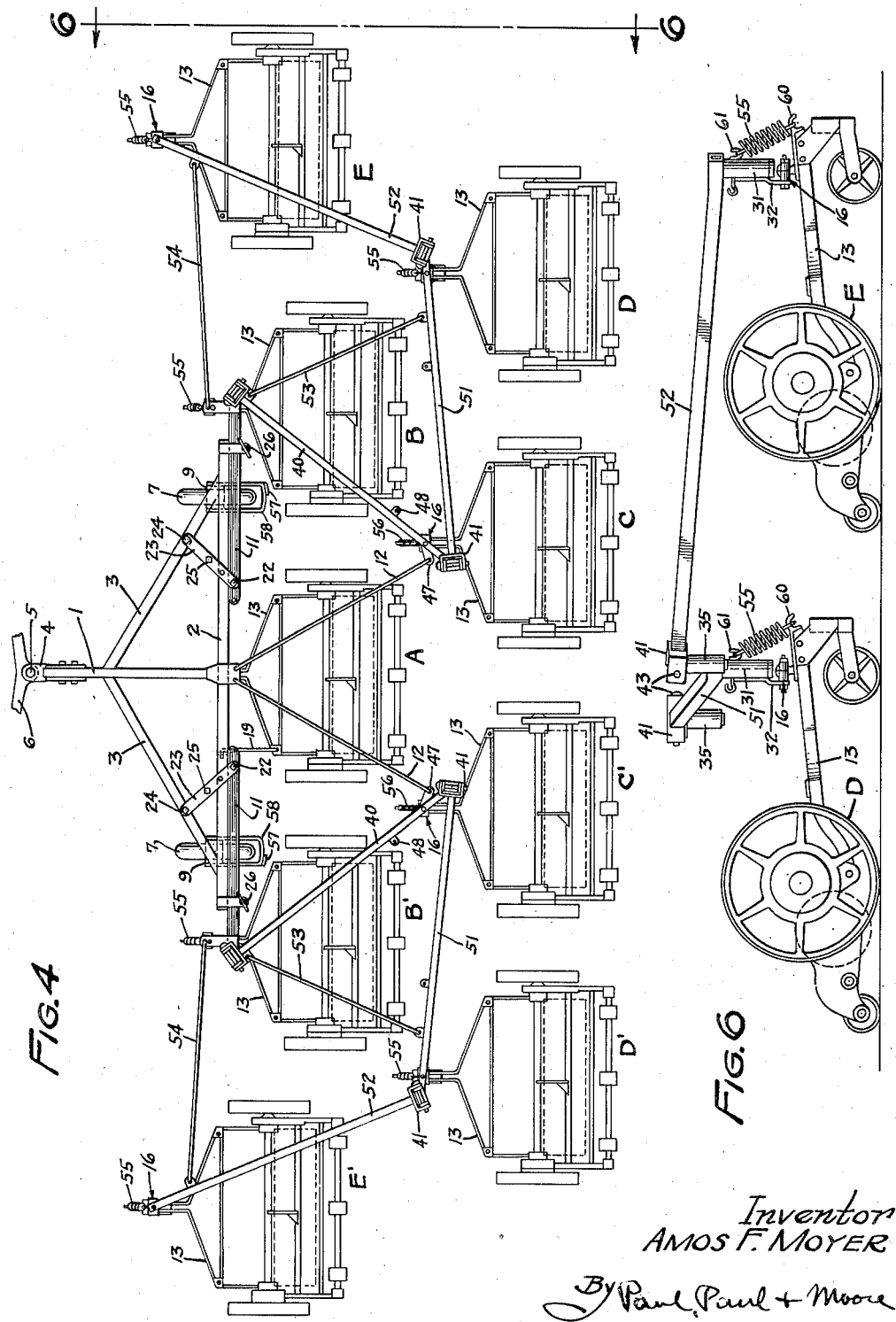
Figure 4 shows the same arrangement of mower units and the same connection to the hitch or draft rig that is shown in Figure 3, but with four additional units added to provide a nine-unit gang; by omitting the forward outside units, a seven-unit gang is provided.

The center mower unit A is preferably connected directly to the main drawbar 1. The units B and B' are connected to the hitch or draft rig 1, 2, 3, by the connecting bars 11, and the spacing rods 12. The connecting bars 11 and spacing rods 12 are angularly arranged and serve to advance the units as power is applied to the draft rig through the drawbar 1, and maintain the units in proper operating positions. When five or more units are employed, the rear units are connected to the draft hitch by means of the connecting bars 40 or 51, and the spacing rods 12 or 53, and the units of the second or rear row are arranged opposite the spaces between the ends of the units of the front row, so that the units of the second row will cut the grass between the units of the first row, as illustrated in Figs. 3 and 4 of the drawings, and as indicated diagrammatically in Figures 20-24 of the drawings.

As above stated, the mower units are preferably, though not necessarily, all alike, and, therefore, any unit may be used at any location in the assembled gang. Each mower unit is preferably of standard construction, as shown in the drawings, and is provided with an individual unit drawbar 13 of substantially U-shape, having its free ends connected with the unit frame as at 8, Figures 7 and 8, and its opposite end reduced to form an arm 14 carrying one member 15, of substantially spherical form, of a universal joint (see Figures 11 and 12).

The socket member 16 of the joint for the center unit A is carried by the main drawbar 1 (see Figures 11, 12 and 18). The socket member 16 is preferably formed of two blocks 17, 17 (see Figure 12) connected by bolts 18, 18, providing a substantially spherical recess to receive the member 15 of the universal joint. This joint permits the unit A to tilt in the direction of the unit axle, or at any angle thereto, and also may permit the unit A to swing laterally in either direction.

When it is desired to prevent the unit A from swinging laterally, a latch rod 19 is provided which may have one end hooked into a hole 20 on the individual unit drawbar 13, and the other end hooked into an opening in a depending bar 21 from the cross-bar 2 (see Figures 2, 3 and 18).

Referring to Figures 1, 7 and 14 of the drawings, the connecting bars 11 are pivoted at their forward ends by a bolt 22 to flat links 23 which extend on either side of the cross-bar 2 and are connected at their ends by a bolt 24 to the brace bar 3. A bolt 25 extends through the links 23 in proximity to the forward edge of the crossbar 2 when the connecting bars 11 and the links 23 are in the position shown in Figure 1 of the drawings. A locking pin 26, preferably provided with a handle 27, may be passed through the openings in the links 23 and through an opening near the end of the connecting bar 11, locking said connecting bars 11 in line with the links 23, as shown in Figures 1, 7 and 14. Each connecting bar 11 is provided at its opposite end with transverse lugs 28, 29, as shown in Figures 1, 8 and 11, from which the vertically disposed shaft 30 depends. Swiveled upon shaft 30 is sleeve 31 having a depending plate 32 to which is bolted socket members 17—17 for connecting a B unit in a manner similar to the connection for the A unit.

The cross-bar 2 is provided at each end with rearwardly extending lugs 33, each having holes therein (see Figures 2 and 13), and each of the bars 11, with the lug 34 having a hole extending through it (see Figure 1). When the bars 11 are turned from the position shown in Figure 1 to the position shown in Figure 2, the holes in the lugs 33 will coincide with the holes in the lugs 34, after removal of the pins 26 from the positions shown in Figures 1, 7 and 14. The pins 26 may then be inserted through the lugs 33 and 34 locking the bars in the positions shown in Figures 2, 3, 4 and 13 of the drawings. The outer ends of the bars 11 are each provided with an upright sleeve 35, preferably welded thereto, (see Figures 2, 3, 4 and 17a).

The connecting bars 40 are preferably similar to each other, and each of said bars is provided at its forward end with one member of a knuckle joint consisting of two clips 41—42, connected by a pin 43, which is held in place by cotter pin 44 (see Figures 15, 16 and 17). The clip 42 carries a pin 45 which may be inserted in the sleeve 35 an the end of the bar 11, when this bar is in the position shown in Figures 2 and 5 of the drawings.

The detail of the other end of the bar 40 is shown in Figure 11ª of the drawings, and is substantially the same as the structure shown in Figure 11, except that the pin 46, instead of being attached to the plates 28, 29 (as is the pin 30 in Figure 11) is here shown attached to the connecting bar 40 passing through plate 47. Spacing rods 12 engage openings provided in plates 47 to retain bars 40 in the position shown in Figures 3 and 11. The bars 40 are also provided, preferably on the sides thereof, forwardly of plate 47 with perforated lugs 48.

The structure already described, if employed with three units, produces a three-unit gang such as shown in Figure 1 of the drawings. With this arrangement, the units are all free to swing laterally, the center unit A being attached by a universal joint to the main drawbar, and the units B and B' being attached by universal joints to the connecting bars 11, and being kept in proper spaced position by the spacing bars 12—12, as shown in Figure 1. The three gang mower of Figure 1 will be kept from skidding by the wheels 7 which are held in rigid position on the draft rig.

If it is desired to produce a five-unit gang, the units B and B' are swung into position shown in Figures 2 and 3 of the drawings, where they are substantially aligned with unit A, and units C and C' are coupled on behind the spaces between units A and B so as to cut a swath that is the width of the three units B, A, B'. If there is danger of skidding at any time, the center unit A may be fastened to the cross-bar 2 by means of the latch 19 shown in Figures 3 and 18.

To produce a seven-unit gang (see Figure 4) units D and D' are arranged in the rear row and are secured in position by connecting bars 51 and spacing rods 53, the bars 51 being of the same construction as the bars 40 except that they are preferably slightly longer, and the spacing rods 53 are similar to spacing rods 12, although they differ slightly in length. Perforated lugs are provided on both the bars 40 and on bars 51 for engagement of spacing rods 53, as shown in Figure 4. To attach the units E and E', making a nine-unit gang, connecting bars 52 are attached to the ends of the bars 51 and spacing rods 54 are attached to plates 28 on bars 11 and to perforated lugs on bars 52. All of the units are preferably similar so that any unit can be used in place of any other unit, and all of the units swing freely laterally (except when the A unit is held by latch 19).

As the wheels 7 that suport the draft rig do not have any swiveling motion, they prevent the gang from skidding when traveling over uneven ground. If it is found that there is a tendency toward such skidding action, the center mower can be locked against turning or swiveling movement by means of the latch pin 19 (Figures 3, 4, 5 and 18). As the units B and B' might swing against the wheels 7, it is found desirable to provide a bumper 57 supported from the wheel support 9 by a plate 58, as shown in Figures 4 and 10. This bumper will prevent injury to the tire, should the outside units B and B' swing laterally into contact therewith.

I have shown in Figure 18, a spring 55 that is secured to a hook 60 upon the forward end of the bar 14 of the center unit A, and to a hook 61 upon the drawbar 1. This spring serves to hold the unit A in contact with the ground. Similar springs may be arranged in connection with the units B and B'. These springs may be replaced by short chains 56 in connection with the other units, as shown in Figure 8.

Figure 5:
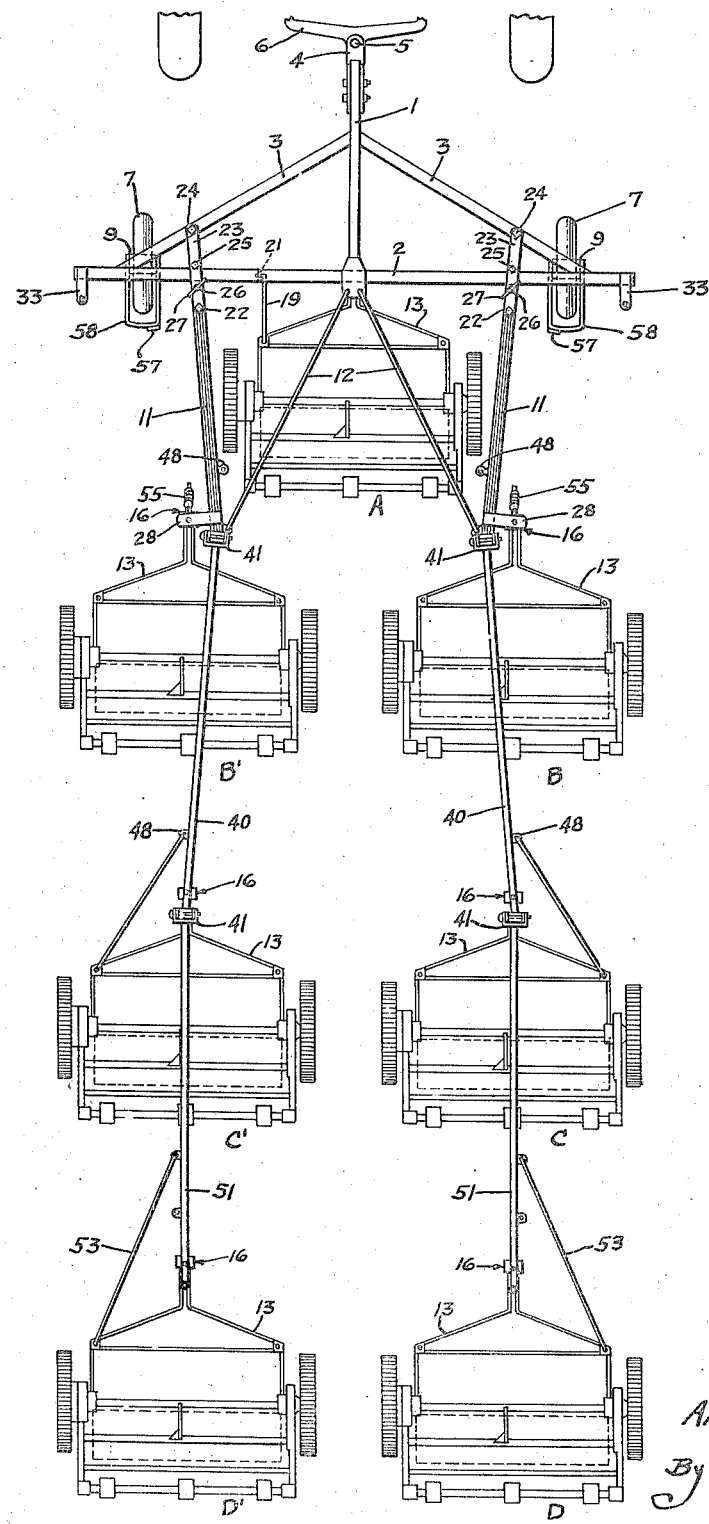
Figure 5 shows the arrangement of seven units, with three of the units in position for operating as a three-unit gang, as shown in Figure 1 of the drawings, and the other units trailing behind the outside units of the three-unit gang.
Figure 19:
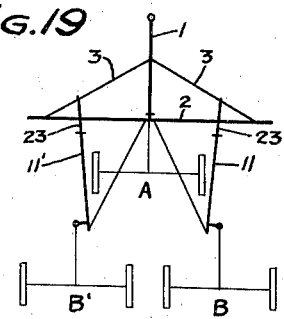
Figure 20:
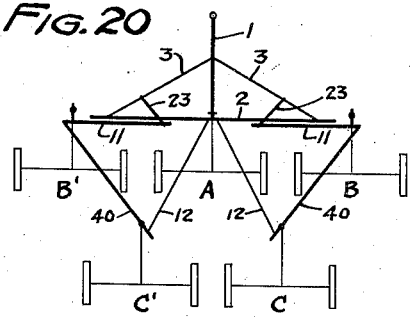
Figure 22:
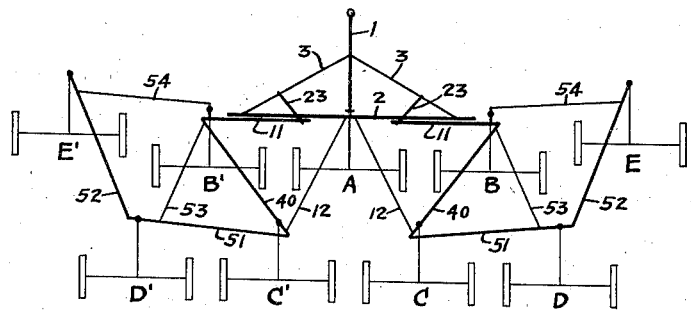
Figure 21:
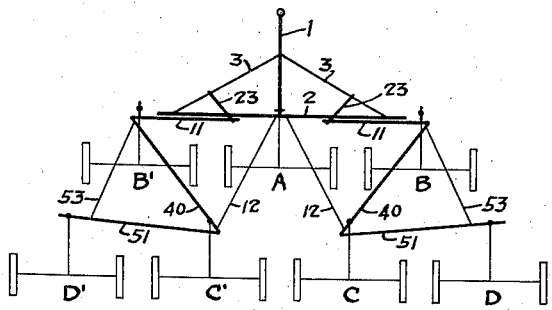

When it is desired to move the gang mower from place to place, and especially when it is desired to pass through narrow openings, such as gateways, the mower units A, B, and B' may be arranged, as shown in Figure 1 of the drawings, and the other mower units may be arranged to trail behind the mower units B and B', as shown in Figure 5 of the drawings, and may be kept from uncontrolled lateral swinging by means of the rods 53 that are connected to the bars 40 and 51, as shown. For this purpose, the cutter drive may be disconnected and the cutters raised so as to be idle, and out of mowing position. It will be understood that means for raising the cutters of any suitable construction may be employed. It will be noted that when rods 53 are engaged, as shown in Figure 5, each connecting bar 40 or 51 is retained against swinging laterally with respect to its unit C, C', D or D', while it is at the same time free to swing laterally about the vertical pivot of the knuckle joint associated with the clip 41 at its forward end. Detailed construction of this knuckle joint appears in Figures 15 and 16 of the drawings.

This construction requires only the minimum of effort for changing of the connections from the mowing position of the units, shown in Figure 4, to the transporting or trailing position shown in Figure 5. This change can be done by one man. This is accomplished by disconnecting the spacing rods 12, 53 and 54 and pins 26, thus leaving interconnected bars 11, 40, 53 and 54 free at their pivotal connections, one with the other. Upon moving the drawbar 1 and draft rig 2, 3, forwardly, the initial zig-zag relationship of bars 11, 40, 53 and 54, as shown in Figure 4, straightens out of itself by virtue of the several laterally swingable connections, after which the rods 12, 53 and 54 and pins 26 are easily engageable in the relationship shown in Figure 5. It is only by virtue of the zig-zag relationship of the bars 11, 40, 53 and 54 that each can be of sufficient length, when the units are in mowing position, so that the operations of changing from mowing position to trailing position, and vice versa, from trailing position to mowing position, can be accomplished by rolling the units freely upon their ground wheels without interference one with the other, and without lifting or disconnecting any unit. The operation of reducing the gang width to three units in mowing position, without lifting or disconnecting any of the units from the gang, is further rendered possible only by the receding of the C and C' units from their rear row mowing positions, so that their mowing positions may be occupied by the B and B' units. The knuckle joint construction of the pivoted connections between bars 40, 51 and 53 permits these several connections to assume any vertical positions dependent each upon the adjacent unit C, C', D or D', while the forward ends of bars 53 assume the vertical positions of units E and E'. Each of the bars 51 and 52, therefore, follows the vertical displacements of two units, one at either end of each bar.

I have shown in the several diagrams, Figures 19 to 22, various hook-ups that can be made to provide a three, five, seven or nine-unit gang, and in Diagram 23 I have shown the units E and E' dropped back into trailing position behind the units D and D'. In Figure 24 I have shown the unit D dropped back into trailing position behind the unit C. It will thus be seen that, with this construction, I may have a gang mower with any desired number of units from one to nine, and that in a similar manner, other units may be added, without any permanent connections being made, and without the use of any frame. I have shown in the drawings the preferred means for securing any desired number of units together forming an extensible gang lawn mower, but I do not restrict myself to the details of construction, as the same may be changed in many particulars, without departing from the scope of my invention as set forth in the following claims.

I claim as my invention:

1. The combination, in a gang lawn mower, with a suitable draft rig, of a mower unit attached to said draft rig by a pivotal connection, a draw link pivotally attached to said draft rig, a second mower unit pivoted to said link, and means for selectively holding said draw link in a position substantially coinciding with the line of travel of said mower or in a position substantially at right angles to said line of travel.

2. The combination, in a gang lawn mower, a crossbar draft rig, a mower unit pivotally attached to said rig, a draw link pivotally attached to said draft rig for movement arcuately over said mower unit, said link being of a length such that its free end clears said unit, a second mower unit pivotally attached to said link, and means for selectively holding said draw link substantially parallel with said crossbar draft rig or at an angle thereto.

3. The combination, in a gang lawn mower, with a suitable draft rig, a mower unit connected to said draft rig by a universal joint, a draft link pivotally connected to said draft rig, means for selectively locking said link in a position substantially parallel with said draft bar or in a position at an angle thereto, a second mower unit pivotally connected to said link adjacent the free end of the link, a third mower unit, and traction means for said third mower unit including a link pivoted to said third mower and to said draft link.

4. The combination, in a gang lawn mower, with a suitable draft rig, a mower unit connected to said draft rig by a universal joint, a draft link pivotally connected to said draft rig, means for selectively locking said link in a position substantially parallel with said draft rig or in a position at an angle thereto, a second mower unit pivotally connected to said link adjacent the free end of the link, a third mower unit, traction means for said third mower unit, including a link pivoted to said third mower and to said draft rig, and a spacer bar connected between said traction link means and said draft rig for positioning said link and said third mower unit with respect to said first and second mower units.

5. The combination, in a gang lawn mower, with a suitable draft rig, of a first mower unit, a pivotal connection between said first mower unit and said draft rig, a pair of mower unit draft links pivotally connected to said draft rig at opposite sides of said first mower unit, and means for selectively holding said links in positions substantially coinciding with the line of travel of said mower, or in positions substantially parallel with said draft rig and with the free ends of said links away from said first mower unit, a second mower unit pivotally attached to one of said mower unit draft links, and a third mower unit pivotally attached to said other mower unit draft link.

6. The combination, in a gang lawn mower, a draft rig, a first mower unit, a universal joint connecting said first mower unit and said draft rig, a pair of mower unit draft links freely pivoted on said draft rig, and means for selectively holding each of said links in a position substantially parallel with said line of travel, or in positions substantially at right angles to said line of travel and with the free end thereof extended from said first mower unit, a second mower unit pivotally attached to one of said links, and a third mower unit pivotally attached to the other of said links.

7. The combination, in a gang lawn mower, a draft rig, a first mower unit, a universal joint connecting said first mower unit and said draft rig, a pair of mower unit draft links freely pivoted on said draft rig, and means for selectively holding each of said links in a position substantially parallel with said line of travel or in positions substantially at right angles to said line of travel and with the free ends thereof extended from said first mower unit, a second mower unit pivotally attached to one of said links, a third mower unit pivotally attached to the other of said links, and means for holding said first mower unit against lateral movement with respect to said draft rig.

8. The combination, in a gang lawn mower, a draft crossbar, a first mower unit, a pivotal connection between said unit and the draft crossbar, a pair of mower unit draft links of a length greater than the length of a mower unit pivotally mounted on said draft crossbar, means for selectively holding each of said draft links in a plurality of positions with respect to said draft crossbar, a second mower unit pivotally connected with one of said mower unit draft links, and a third mower unit pivotally connected with the other of said mower unit draft links.

9. The combination, in a gang lawn mower, a draft rig, a first mower unit, a universal joint connecting said first mower unit and said draft rig, a pair of mower unit draft links freely pivoted on said draft rig, and means for selectively holding each of said links in a position substantially parallel with said line of travel, or in positions substantially at right angles to said line of travel and with the free end thereof extended from said first mower unit, a second mower unit pivotally attached to one of said links, a third mower unit pivotally attached to the other of said links, and means for attaching additional units in mowing relation behind said three units when the mower unit draft link is held in the selected position substantially at right angles to the line of travel.

10. The combination, in a gang lawn mower, a draft crossbar, a first mower unit pivotally connected to said crossbar, a pair of mower unit drag links of greater length than said mower units, pivotally mounted on said draft crossbar, means for selectively holding each of said draft links in a position substantially parallel with said crossbar and with the free end away from said first mower unit, a second mower unit pivotally mounted adjacent the free end of one of said drag links, a third mower unit pivotally mounted adjacent the free end of the other of said drag links and trailing mower draft means comprising draft bars pivotally connected to each of said drag links, means for selectively holding each of said draft bars in fixed angular relation with respect to the draft links to which each is pivoted, and a mower unit pivotally connected to each of said draft bars.

11. The combination, in a gang lawn mower, a draft rig, supporting wheels for said draft rig, a plurality of mower units pivotally mounted on said draft rig, the location of said pivotal mountings with respect to said supporting wheels, and the size of said mower units being such that said units intersect the position of the wheels when the units are moved pivotally with respect to said draft rig, and bumpers adjacent said wheels to intercept said mowers during said pivotal movement.

12. The combination of a gang lawn mower, a draft rig, supporting wheels for said draft rig, a pair of mower unit draw-bars, pivotal mounting means on said draft rig for said draw-bars, means for holding each of said bars when pivoted to positions substantially coinciding with the line of travel of the mowers, and means for holding each of said bars in a position substantially at right angles to said line of travel, and mower units pivotally connected to each of said draw-bars adjacent their free ends.

13. The combination of a gang lawn mower, a draft rig, supporting wheels for said draft rig, a pair of mower unit draw-bars, pivotal mounting means on said draft rig for said draw-bars, means for holding each of said bars when pivoted to positions substantially coinciding with the line of travel of the mowers, and means for holding each of said bars in a position substantially at right angles to said line of travel, mower units pivotally connected to each of said draw-bars adjacent their free ends, and a hitch-bar connected centrally of said draft rig and protruding forwardly from said draft rig supporting wheels.

14. In a gang lawn mower, a draft rig including a crossbar, a mower unit positioned centrally of said draft crossbar, a pivotal connection between said unit and said crossbar, a draft chain attached to said crossbar for pulling a plurality of additional mower units comprising a plurality of stiff draft links, each link having a length greater than said mower unit length, universal pivotal connections between said links, and a mower unit pivotally connected to each link adjacent the end of said link.

15. In a gang lawn mower, a draft rig including a crossbar, a mower unit positioned centrally of said draft crossbar, a pivotal connection between said unit and said crossbar, and a pair of draft chains attached on opposite sides of said centrally located mower unit for pulling a plurality of additional mower units, each of said chains comprising a plurality of stiff draft links, each link being of a length greater than said mower unit length, universal pivotal connections between adjacent links, and a mower unit pivotally connected to each link adjacent the end of said link.

16. In a gang lawn mower, a draft rig including a crossbar, a mower unit positioned centrally of said draft crossbar, a pivotal connection between said unit and said crossbar, a draft chain attached to said crossbar for pulling a plurality of additional mower units comprising a plurality of stiff draft links, each link having a length greater than said mower unit length, universal pivotal connections between said links, a mower unit pivotally connected to each link adjacent the end of said link, and a quickly detachable spacer bar connected to each chain link adjacent said mower unit pivotal connection, and a connection between the opposite end of each spacer bar and to said draft rig.

17. In a gang lawn mower, a draft rig including a crossbar, a mower unit positioned centrally of said draft crossbar, a pivotal connection between said unit and said crossbar, and a pair of draft chains attached on opposite sides of said centrally located mower unit for pulling a plurality of additional mower units, each of said chains comprising a plurality of stiff draft links, each link being of a length greater than said mower unit length, universal pivotal connections between adjacent links, a mower unit pivotally connected to each link adjacent the end of said link, and a quick detachable spacer bar connected to each chain link adjacent said mower unit pivotal connection, and a connection between the opposite end of each spacer bar and said draft rig.

AMOS F. MOYER.